United States Patent [19]
Ono et al.

[11] 3,879,453
[45] Apr. 22, 1975

[54] PROCESS FOR PRODUCING METHACROLEIN AND METHACRYLIC ACID

[75] Inventors: Isao Ono; Teruhisa Sakamoto; Toshio Hironaka, all of Yamaguchi, Japan

[73] Assignee: Toyo Soda Manufacturing Co., Ltd., Yamaguchi, Japan

[22] Filed: May 30, 1973

[21] Appl. No.: 365,100

[30] Foreign Application Priority Data
May 30, 1972 Japan.............................. 47-53662
Aug. 2, 1972 Japan.............................. 47-77469

[52] U.S. Cl............. 260/533 N; 252/456; 252/464; 252/469; 252/467; 260/604 R
[51] Int. Cl...................... C07c 51/32; C07c 57/04
[58] Field of Search.................... 260/533 N, 604 R

[56] References Cited
UNITED STATES PATENTS
3,574,729  4/1971  Ganon ............................ 260/530 N
3,736,355  5/1973  Croci et al. ..................... 260/533 N FOREIGN PATENTS OR APPLICATIONS
971,666  9/1964  United Kingdom............. 260/533 N
2,050,155  5/1972  Germany ......................... 260/530 N

*Primary Examiner*—Lorraine A. Weinberger
*Assistant Examiner*—Richard D. Kelly
*Attorney, Agent, or Firm*—Oblon, Fisher, Spivak, McClelland & Maier

[57] ABSTRACT

Methacrolein and methacrylic acid are produced by the catalytic oxidation of isobutylene in the vapor phase with molecular oxygen over a catalytic amount of a mixture of solid metal oxides, represented by the empirical formula $Sb_aV_bMo_cTe_dW_eM_fO_g$, wherein M represents at least one element selected from the group consisting of bismuth, thallium and uranium, and wherein the elemental atomic ratios of said empirical formula have values of $a=10$, $b=0.1-10$, $c=0.4-15$, $d=0.1-10$, $e=0-2$, $f=0-2$ and $g=16-127$, so as to satisfy the empirical formula.

12 Claims, No Drawings

PROCESS FOR PRODUCING METHACROLEIN AND METHACRYLIC ACID

BACKGROUND OF THE INVENTION

1. Field of the Invention

The present invention relates to a process for producing methacrolein and methacrylic acid in high yields by the vapor phase catalytic oxidation of isobutylene. More particularly, it relates to a process for the vapor phase catalytic oxidation which comprises the use of a novel multi-component catalytic system consisting of antimony, vanadium, molybdenum and tellurium and/or tungsten and one or more elements selected from the group consisting of bismuth, thallium and uranium.

2. Description of the Prior Art

Substantial research has been done on methods for producing methacrolein and methacrylic acid by the catalytic vapor phase oxidation of isobutylene. Numerous catalyst systems have also been studied and reported for this oxidation reaction. Of primary importance, from the industrial point of view, is the achievement of the highest possible single-pass yield of useful products, because it is generally uneconomical to recover and recycle unreacted isobutylene. However, as the conversion rate of isobutylene is increased, the quantity of undesirable products produced, such as carbon dioxide, carbon monoxide and acetic acid also increases because of gradual oxidative decomposition. This causes a decrease in the selectivity for methacrolein and methacrylic acid. In addition to the requirement for high single-pass yields of product the catalyst system must also have a sufficient activity as well as possess a sufficient lifetime so as to be useable in industrial applications.

Although various catalyst systems have been reported in connection with the production of methacrolein and methacrylic acid from isobutylene, satisfactory results have not been attained with these systems. For instance, Japanese Patent Publ. No. 9872/1964 discloses an oxide catalyst system consisting of molybdenum, vanadium and phosphorus and Japanese Patent Publn. No. 3164/1968 discloses an oxide catalyst system consisting of molybdenum, vanadium and bismuth. In both of these catalyst systems extremely high reaction temperatures, ranging from 450° to 550°C are required, which shortens the lifetime of the catalysts. Also the single-pass yields of methacrolein and methacrylic acid are insufficiently low. Thus, both of these catalyst systems are considered to be industrially unsatisfactory.

Example 3 of Japanese Patent Publn. No. 19485/1970 discloses the use of a catalyst system consisting of molybdenum, antimony, tellurium, and sodium or potassium which produces a fairly good single-pass yield of methacrolein and methacrylic acid. However, the activity of the catalyst is insufficient, and also the lifetime of the catalyst is limited when sodium or potassium are lacking. In another catalyst system consisting of iron, antimony, tellurium and vanadium (or molybdenum or tungsten) as disclosed in Japanse Patent Publn. No. 1607/1972, a high combustion rate of isobutylene is achieved resulting in single-pass yields of methacrolein which amount to only about 60 percent, with the by-product of methacrylic acid limited to only about 1 to 2 percent.

A need, therefore, exists for a catalyst system which promotes the oxidative conversion of isobutylene to methacrolein and methacrylic acid in high single-pass yields while achieving high selectivity for methacrolein and methacrylic acid.

SUMMARY OF THE INVENTION

Accordingly, one object of the present invention is to provide a catalyst system which promotes the oxidative conversion of isobutylene to methacrolein and methacrylic acid in high yields and high selectivity.

Another object of the present invention is to provide a multicomponent catalyst system for the oxidative conversion of isobutylene which contains antimony in addition to at least three other polyvalent metal elements.

Briefly, these objects and other objects of the invention as hereinafter will become readily apparent can be achieved by use of a solid metal oxide catalyst for the vapor phase, catalytic oxidation of isobutylene with molecular oxygen which comprises a mixture of metal oxides having the empirical formula $Sb_aV_bMo_cTe_dW_eM_fO_g$, wherein M represents one or more elements selected from the group consisting of bismuth, thallium and uranium and wherein the elemental atomic ratios of said empirical formula have values of $a=10$, $b=0.1-10$, $c=0.4-15$, $d=0.1-10$, $e=0-2$, $f=0-2$ and $g=16-127$, so as to satisfy the empirical formula.

DESCRIPTION OF THE PREFERRED EMBODIMENTS

In the present invention for the catalytic conversion of isobutylene to methacrolein and methacrylic acid in high yields a solid metal oxide catalyst system is used which is represented by the empirical formula $Sb_aV_bMo_cTe_dW_eM_fO_g$, wherein M is one or more elements selected from the group consisting of bismuth, thallium and uranium and $a, b, c, d, e, f$ and $g$ are the atomic ratios of the elements. The atomic ratios encompass the ranges of $a=10, b=0.1-10, c=0.4-15, d=0.1-10, e=0-2, f=0-2$ and $g=16-127$. Optimum catalyst performance is obtained when the atomic ratios in the catalyst compositions preferably encompass the ranges of $a=10$, $b=1-4, c=1-8, d=2-8, e=0.1-1$ and $f=0.1-1$, and $g$ satisfies the empirical formula.

The catalyst of the present invention may be employed as is, or it may be mixed with a suitable carrier such as diatomaceous earth, silica, alumina, titanium oxide, carborundum pellets, zirconium oxide to improve the physical strength, thermal stability, reactivity, selectivity and the like of the catalyst. Although the catalyst of this invention may be prepared by any of several conventional methods, it is preferably prepared by uniformly mixing aqueous solutions of each component followed by isolating and drying the mixture.

In one embodiment of the preparation, for example, a catalyst is prepared which uses antimony trioxide as the source of antimony, ammonium meta-vanadate as the vanadium source, tellurium dioxide as the tellurium source, ammonium molybdate as the molybdenum source, ammonium tungstate as the tungsten source, bismuth nitrate as the bismuth source, thallium trichloride or thallium nitrate as the thallium source and uranyl nitrate as the uranium source. First, ammonium molybdate is dissolved in warm water into which an aqueous solution of ammonium metavanadate is dissolved and mixed. Aqueous solutions of ammonium tungstate and/or tellurium dioxide are added to the mixture and thoroughly stirred. Aqueous solutions of bismuth nitrate and/or thallium trichloride and/or uranyl nitrate are added, and antimony trioxide is mixed in the composition. The composition is thoroughly stirred, and then is concentrated by evaporation. If desired, a suitable carrier material as indicated above may be added. The slurry is further concentrated and dried, and then calcined in air at a temperature in the range of 400° to 600°C. The calcination temperature is not critical, but it is desirable to conduct the calcination at a temperature of 460° to 540°C for several hours.

Suitable reactors for the oxidation of isobutylene include either fixed bed or fluid bed reactors which contain the catalyst of this invention. The gas fed to the reactors is composed of isobutylene and molecular oxygen to which nitrogen, carbon dioxide, steam or the like may optionally be added as an inert diluent. The reaction may be carried out at temperatures ranging from 250° to 500°C, preferably ranging from 350° to 420°C. Though the apparent contact time of the reactants greatly varies according to the reaction temperature and the composition of the feed gas, a range of 0.5 to 20 seconds, preferably a range of 1 to 12 seconds is suitable. The composition of the feed gas may vary over a wide range, but it is preferable to use a feed gas composition which is in the range of 1 to 10 mole percent isobutylene, 20 to 90 mole percent air and 1 to 50 mole percent steam.

The isobutylene which is used as the raw material of the invention need not be of a high purity. Even if other saturated or unsaturated hydrocarbons such as ethylene, propylene, propane, butane, and the like are present, these substances are not oxidized but merely pass through the reactor, as would any inert diluent. Similarly it is not always necessary to use pure oxygen as the source of oxygen. Air is a suitable source of oxygen and is desirable for economical reasons.

By using the catalyst of this invention in conventional processes, such as is disclosed in Japanese Patent Publn. No. 7881/1967, it is possible to produce methacrolein and methacrylic acid from isobutylene, and simultaneously butadiene from n-butenes by the oxidation of a $C_4$ hydrocarbon fraction.

Having generally described this invention, a further understanding can be obtained by reference to certain specific examples which are provided herein for purpose of illustration only and are not intended to be limiting unless otherwise specified. The terms "conversion of isobutylene", "selectivity" and "single-pass yield" which are used herein are defined by the following equations.

$$\text{Conversion of isobutylene} = \frac{\text{moles of isobutylene converted}}{\text{moles of isobutylene fed}} \times 100\%$$

$$\text{Selectivity} = \frac{\text{moles of each product} \times \frac{\text{carbon number of each product}}{4}}{\text{moles of isobutylene converted}} \times 100\%$$

$$\text{Single-pass yield} = \frac{\text{moles of each product} \times \frac{\text{carbon number of each product}}{4}}{\text{moles of isobutylene fed}} \times 100\%$$

The results of the experiments using the catalyst of this invention are shown in the examples and a number of comparative examples, were conducted using the experimental procedure described below.

A 20 gram amount of a catalyst in tablet form with a diameter of 3mm was placed in a fixed bed tubular reactor made of pyrex glass having an inside diameter of 20mm. The reactor was immersed in a tubular electric furnace, and a gas mixture containing about 5 mole percent isobutylene, about 60 mole percent air and about 35 mole percent steam was fed into the reactor while it was heated. The apparent contact time was selected to fall within the range of 4 to 7 seconds at a constant reaction temperature in the range of 360° to 430°C. The gas evolved from the reactor was cooled by an ice water solution and by a dry-ice methanol solution. After passage of the gas through the cold traps, the evolved gas and the liquids trapped in the dry-ice bath were analyzed by gas chromatography and partially by titrimetry and the constituents and their respective quantities were determined.

EXAMPLE 1

An 18.0 gram amount of ammonium paramolybdate $(NH_4)_6Mo_7O_{24} \cdot 4H_2O$ was dissolved in 400cc of distilled water, and 11.6 grams of ammonium metavanadate $NH_4VO_3$ was added and dissolved in the molybdate solution with stirring while being heated over a hot water bath. An 8.0 gram amount of tellurium dioxide $TeO_2$ and 73.2 grams of antimony trioxide $Sb_2O_3$ were added to the solution and it was thoroughly stirred. The resulting solution was concentrated by evaporation and the residue was dried. The dried residue was punched into tabloids of 3mm diameter which were calcined at a temperature of 520°C for 5 hours. A catalyst having a composition of Sb:V:Mo:Te=10:2:2:1 (atomic ratio) was obtained in this manner.

The oxidative conversion of isobutylene was conducted over this catalyst at a reaction temperature of 400°C and a contact time of 5.0 seconds. The results are shown in Table I wherein the conversion of isobutylene is 96.4 percent, the selectivities of methacrolein and methacrylic acid 74.0 and 7.6 percent respectively; and the composite single-pass yield of methacrolein and methacrylic acid is 78.6 percent.

EXAMPLE 2

A catalyst with a composition of Sb:V:Mo:Te=10:2:4:2 (atomic ratio) was prepared in a manner similar to that described in Example 1. The oxidative conversion was conducted under the same reaction conditions as described in Example 1. The results obtained are shown in Table I, wherein the conversion of isobutylene is 97.5 percent, the selectivity of methacrolein is 76.0 percent, the selectivity of methacrylic acid is 5.3 percent, and the composite single-pass yield of methacrolein and methacrylic acid is 79.3 percent.

EXAMPLE 3

A catalyst having a composition of Sb:V:Mo:Te=10:3:2:2 (atomic ratio) was obtained in a manner similar to that described in Example 1. The oxidative conversion of isobutylene was conducted under the same reaction conditions described in Example 1. The results obtained are shown in Table I, wherein the conversion of isobutylene is 99.8 percent, the selectivities of methacrolein and methacrylic acid are 67.2 and 10.2 percent respectively, and the composite single-pass yield of methacrolein and methacrylic acid is 77.2 percent.

EXAMPLES 4, 5, and 6

Catalysts with composition (atomic ratios) of Sb:V:Mo:Te=10:2:8:2 (Example 4), Sb:V:Mo:Te:=10:2:3:6 (Example 5) and Sb:V:Mo:Te=10:2:3:1.6 (Example 6) were prepared in a manner similar to that described in Example 1. The oxidative conversion of isobutylene was conducted with the catalysts prepared in the manner indicated. The results obtained are shown in Table I, wherein the conversion of isobutylene is 94.2 percent, the selectivities of methacrolein and methacrylic acid are 72.6 and 6.21 percent respectively and the composite single-pass yield of methacrolein and methacrylic acid is 74.2 percent for Example 4; the conversion of isobutylene is 92.3 percent, the selectities of methacrolein and methacrylic acid are 74.8 and 5.2 percent respectively and the composite single-pass yield of methacrolein and methacrylic acid is 73.8 percent for Example 5; and the conversion of isobutylene is 96.8 percent, the selectivities of methacrolein and methacrylic acid are 70.8 and 6.7 percent respectively, and the composite single-pass yield of methacrolein and methacrylic acid is 75.0 percent for Example 6.

COMPARATIVE EXAMPLE 1

A catalyst having a composition of Sb:V:Te=10:2:2 (atomic ratio) was obtained in a manner similar to that described in Example 1 except that the molybdenum compound was not added in this case, and the oxidative conversion of isobutylene was conducted with the catalyst obtained at a reaction temperature of 435°C with a contact time of 5.0 seconds.

The results obtained are shown in Table I, wherein the conversion of isobutylene is 94.0 percent, the selectivities of methacrolein and methacrylic acid are 57.6 and 6.3 percent respectively and the composite single-pass yield of methacrolein and methacrylic acid is 60.0 percent.

COMPARATIVE EXAMPLE 2

A catalyst having a composition of Sb:V:Mo=10:2:2 (atomic ratio) was prepared in a manner similar to that described in Example 1 except that the tellurium compound was not added in this instance. The oxidative conversion of isobutylene was conducted with the catalyst obtained at a reaction temperature of 440°C with a contact time of 4.8 seconds. The results obtained are shown in Table I, wherein the conversion of isobutylene is 89.7 percent, the selectivities of methacrolein and methacrylic acid are 27.2 and 12.3 percent respectively and the composite single-pass yield of methacrolein and methacrylic acid is 35.4 percent.

COMPARATIVE EXAMPLE 3

A catalyst having a composition of Sb:Te:Mo=10:2:2 (atomic ratio) was obtained in a manner similar to that described in Example 1 except that the vanadium compound was not added in this case. The oxidative conversion of isobutylene was conducted with the catalyst obtained at a reaction temperature of 440°C with a contact time of 7.0 seconds.

The results are shown in Table I, wherein the conversion of isobutylene is 91.0 percent, the selectivities of methacrolein and methacrylic acid are 63.5 and 4.3 percent respectively, and the composite single-pass yield of methacrolein and methacrylic acid is 62.8 percent.

COMPARATIVE EXAMPLE 4

A catalyst having a composition of V:Mo:Te=2:4:2 (atomic ratio) was obtained in a manner similar to that described in Example 1 except that the antimony compound was not added in this case. The oxidative conversion of isobutylene was conducted with the catalyst obtained at a reaction temperature of 420°C with a contact time of 7.0 seconds.

The results are shown in Table I, wherein the conversion of isobutylene is 93.7 percent, the selectivities of methacrolein and methacrylic acid are 62.0 and 4.6 percent respectively, and the composite single-pass yield of methacrolein and methacrylic acid is 62.4 percent.

COMPARATIVE EXAMPLE 5

A catalyst having a composition of V:Mo:Te=6:8:1 (atomic ratio) was obtained in a manner similar to that described in Comparative Example 4, and the oxidative conversion of isobutylene was conducted over the catalyst obtained at a reaction temperature of 400°C with a contact time of 5.0 seconds. The results obtained are shown in Table I, wherein the conversion of isobutylene is 89.0 percent, the selectivities of methacrolein and methacrylic acid are 42.3 and 9.6 percent respectively, and the composite single-pass yield of methacrolein and methacrylic acid is 46.3 percent.

TABLE I

| | Catalyst Composition (in atomic ratio) | | | | | Reaction Condition | | | Conversion of iso-butylene | | | Selectivity % | | | Composite single-pass yield of MAL and MMA |
|---|---|---|---|---|---|---|---|---|---|---|---|---|---|---|---|
| | Sb | V | Mo | Te | W | Reaction temp. °C | Conc. of iso-butylene % | Contact time sec. | | MAL | MAA | Acetic acid | $CO_2$ | CO | |
| Ex. | | | | | | | | | | | | | | | |
| 1 | 10 | 2 | 2 | 1 | 0 | 400 | 5.36 | 5.0 | 96.4 | 74.0 | 7.6 | 3.8 | 8.6 | 4.0 | 78.6 |
| 2 | 10 | 2 | 4 | 2 | 0 | 400 | 5.12 | 5.0 | 97.5 | 76.0 | 5.3 | 4.7 | 7.9 | 4.7 | 79.3 |
| 3 | 10 | 3 | 2 | 2 | 0 | 400 | 5.61 | 5.0 | 99.8 | 67.2 | 10.2 | 3.3 | 11.7 | 6.0 | 77.2 |
| 4 | 10 | 2 | 8 | 2 | 0 | 415 | 5.24 | 5.4 | 94.2 | 72.6 | 6.2 | 5.0 | 10.2 | 5.4 | 74.2 |
| 5 | 10 | 2 | 3 | 6 | 0 | 420 | 5.18 | 6.0 | 92.3 | 74.8 | 5.2 | 4.8 | 9.2 | 4.3 | 73.8 |
| 6 | 10 | 2 | 3 | 1.6 | 0 | 400 | 5.60 | 5.0 | 96.8 | 70.8 | 6.7 | 4.2 | 9.4 | 4.2 | 75.0 |
| Comparative Ex. | | | | | | | | | | | | | | | |
| 1 | 10 | 2 | 0 | 2 | 0 | 435 | 5.49 | 5.0 | 94.0 | 57.6 | 6.3 | 3.1 | 20.2 | 6.1 | 60.0 |
| 2 | 10 | 2 | 2 | 0 | 0 | 440 | 5.23 | 4.8 | 89.7 | 27.2 | 12.3 | 12.3 | 19.3 | 13.5 | 35.4 |
| 3 | 10 | 0 | 2 | 2 | 0 | 440 | 5.55 | 7.0 | 91.0 | 63.5 | 4.3 | 4.3 | 12.9 | 7.7 | 62.8 |
| 4 | 0 | 2 | 4 | 2 | 0 | 420 | 4.79 | 7.0 | 93.7 | 62.0 | 4.6 | 7.5 | 14.6 | 6.2 | 62.4 |
| 5 | 0 | 6 | 8 | 1 | 0 | 400 | 5.76 | 5.0 | 89.0 | 42.3 | 9.6 | 11.8 | 18.3 | 12.8 | 46.3 |

Note:
MAL: Methacrolein
MAA: Methacrylic acid

EXAMPLE 7

A 21.6 gram amount of ammonium paramolybdate $(NH_4)_6Mo_7O_{24}\cdot 4H_2O$ was dissolved in 400cc of water and 11.6 grams of ammonium metavanadate $NH_4VO_3$ were added to the solution. The added material was dissolved by stirring over a hot water bath. Then 4.8 grams of bismuth nitrate $(Bi(NO_3)_3\cdot 5H_2O$ as a fine powder, and 16.0 grams of tellurium dioxide $TeO_2$ were added to the solution with thorough stirring. Finally 73.2 grams of antimony trioxide $Sb_2O_3$ were added and the solution was further stirred thoroughly.

The resulting solution was concentrated by evaporation and the residue obtained was dried. The dried residue was punched into tabloids with a diameter of 3mm, and was further dried and calcined at 500°C for 5 hours. A catalyst having a composition of $Sb_{10}V_2Mo_{2.4}Te_2Bi_{0.2}$ (atomic ratio) was prepared in this manner.

The oxidative conversion of isobutylene was conducted with the catalyst prepared at a reaction temperature of 400°C with a contact time of 4.6 seconds. The results obtained are shown in Table II, wherein the conversion of isobutylene is 99.0 percent, the selectivities of methacrolein and methacrylic acid are 67.4 and 14.6 percent respectively, and the selectivities of acetic acid, carbon dioxide and carbon monoxide are 2.8, 8.6 and 5.0 percent respectively. As a consequence, the single-pass yield of methacrolein and methacrylic acid was 81.2 percent.

EXAMPLE 8

A catalyst having a composition of $Sb_{10}V_2Mo_4Te_2Bi_{0.8}$ (atomic ratio) was prepared in a manner similar to that described in Example 7. The oxidative conversion of isobutylene was conducted over the catalyst prepared at a reaction temperature of 400°C with a contact time of 4.6 seconds. The results are shown in Table II, wherein the conversion of isobutylene is 99.5 percent, the selectivities of methacrolein and methacrylic acid are 67.8 and 12.8 percent respectively and the composite single-pass yield of methacrolein and methacrylic acid is 80.2 percent.

EXAMPLE 9

A catalyst having a composition of $Sb_{10}V_2Mo_{2.4}Te_2W_{0.3}Bi_{0.2}$ (atomic ratio) was prepared in a manner similar to that described in Example 7 except that 100cc of an aqueous solution containing 3.9 grams of ammonium paratungstate was added to the solution prior to the addition of bismuth nitrate.

The oxidative conversion of isobutylene was conducted over the catalyst obtained at a reaction temperature of 380°C with a contact time of 4.6 seconds. The results obtained are shown in Table II, wherein the conversion of isobutylene is 99.2 percent, the selectivities of methacrolein and methacrylic acid are 63.4 and 15.8 percent respectively, the single-pass yield of methacrylic acid is 15.7 percent and the composite single-pass yield of methacrolein and methacrylic acid is 78.6 percent.

EXAMPLE 10

A catalyst having a composition of $Sb_{10}V_2Mo_3Te_2Tl_{0.3}$ (atomic ratio) was prepared in a manner similar to that described in Example 7, except that an aqueous solution of thallium trichloride was used instead of a solution of bismuth nitrate. The oxidative conversion of isobutylene was conducted over the catalyst obtained at a reaction temperature of 400°C with a contact time of 5.0 seconds. The results obtained are shown in Table II, wherein the conversion of isobutylene is 96.8 percent, the selectivities of methacrolein and methacrylic acid are 67.6 and 15.3 percent respectively, the single-pass yield of methacrylic acid is 14.7 percent, and the composite single-pass yield of methacrolein and methacrylic acid is 80.2 percent.

EXAMPLE 11

A catalyst of a composition of $Sb_{10}V_2Mo_3Te_2Tl_{1.0}$ (atomic ratio) was prepared in a manner similar to that described in Example 10. The oxidative conversion of isobutylene was conducted at a reaction temperature of 400°C with a contact time of 5.0 seconds. The results obtained are shown in Table II, wherein the conversion of isobutylene is 94.9 percent, the selectivites of methacrolein and methacrylic acid are 72.8 and 12.3 percent respectively, and the selectivities of acetic acid, carbon dioxide and carbon monoxide are 2.6, 6.3 and 2.8 percent respectively. As a consequence, the single-pass yield of methacrylic acid was 11.7 percent and the composite single-pass yield of methacrolein and methacrylic acid was 80.8 percent.

EXAMPLE 12

A 47.7 gram amount of ammonium paramolybdate $(NH_4)_6Mo_7O_{24}\cdot 4H_2O$ was dissolved in 600cc of water and 31.6 grams of ammonium methavanadate $NH_4VO_3$ were added thereto. The vanadate material was dissolved by stirring the mixture over a warm water bath. To this solution was added 100cc of an aqueous solution containing 20.7 grams of thallium trichloride $TlCl_3\cdot 4H_2O$ and the solution was thoroughly stirred. Next, 28.7 grams of tellurium dioxide was added with stirring to the solution. Then, after 157.4 grams of antimony trioxide were added and thoroughly mixed in the solution, 29.1 grams of diatomaceous earth was added with continuous stirring. The resulting solution was concentrated by evaporation and the residue was dried. The dried residue was punched into tabloids with a diameter of 3mm and was dried and calcined at 500°C for 5 hours. A catalyst of a composition of $Sb_{12}V_3Mo_3Te_3Tl_{0.6}$ (atomic ratio) containing 10 percent by weight diatomaceous earth carrier was prepared in this manner.

The oxidative conversion of isobutylene was conducted over the catalyst obtained in this way at a reaction temperature of 400°C with a contact time of 4.2 seconds. The results showed a 99.1 percent conversion of isobutylene, a 63.0 percent selectivity of methacrolein, and a 17.8 percent selectivity of methacrylic acid. The selectivities of acetic acid, carbon dioxide and carbon monoxide were 3.9, 9.8 and 4.5 percent respectively. As a consequence, the single-pass yield of methacrylic acid was, as shown in Table II 17.6 percent and the composite single-pass yield of methacrolein and methacrylic acid was 80.1 percent.

EXAMPLE 13

A catalyst having a composition of $Sb_{10}V_2Mo_3Te_2W_{0.3}Tl_{0.3}$ (atomic ratio) was obtained in a manner similar to that described in Example 9 except that thallium trichloride was used instead of bismuth nitrate.

When the oxidative conversion of isobutylene was conducted over the catalyst obtained at a reaction temperature of 390°C with a contact time of 4.6 seconds, results were obtained which are shown in Table II, wherein the conversion of isobutylene is 95.3 percent, the selectivities of methacrolein and methacrylic acid are 64.8 and 16.0 percent respectively, the single-pass yield of methacrylic acid is 15.2 percent, and the composite single-pass yield of methacrolein and methacrylic acid is 77.0 percent.

EXAMPLE 14

A catalyst of a composition of $Sb_{10}V_2Mo_3Te_2W_{0.3}Bi_{0.2}Tl_{0.3}$ (atomic ratio) was prepared in a manner similar to that described in Example 9 except that thallium trichloride was added to the solution after the addition of bismuth nitrate.

The oxidative conversion of isobutylene was conducted over the catalyst prepared in this way at a reaction temperature of 386°C with a contact time of 4.6 seconds. The results obtained are shown in Table II, wherein the conversion of isobutylene is 98.3 percent, the selectivites of methacrolein and methacrylic acid are 61.7 and 16.5 percent respectively, the single-pass yield of methacrylic acid is 16.2 percent, and the composite single-pass yield of methacrolein and methacrylic acid is 76.9 percent.

EXAMPLES 15, 16, 17

Catalysts of compositions (atomic ratios) of $Sb_{10}V_2Mo_3Te_2U_{0.2}$ (Example 15), $Sb_{10}V_2Mo_3Te_2U_{0.4}$ (Example 16) and $Sb_{10}V_2Mo_3Te_2U_{0.6}$ (Example 17) were prepared in a manner similar to that described in Example 7 except that uranyl nitrate was added to the mixture instead of bismuth nitrate. The subsequent oxidative conversions of isobutylene with each catalyst prepared were conducted at a reaction temperature of 380°C with a contact time of 5.0 seconds. As shown in Table II, the best catalytic performance was obtained when the atomic ratio of uranium was about 0.2 in relation to Sb=10.

EXAMPLE 18

A catalyst of a composition of $Sb_{10}V_2Mo_3Te_2U_{0.2}Bi_{0.2}$ (atomic ratio) was prepared in a manner similar to that described in Example 7, except that uranyl nitrate was added to the mixture after the addition of bismuth nitrate. The oxidative conversion of isobutylene was conducted with the catalyst obtained at a reaction temperature of 380°C with a contact time of 4.6 seconds. The results obtained are shown in Table II, wherein the conversion of isobutylene is 98.0 percent, the selectivity of methacrolein is 64.2 percent, the single-pass yield of methacrylic acid is 17.0 percent, and the composite single-pass yield of methacrolein and methacrylic acid is 79.9 percent.

EXAMPLE 19

A catalyst having a composition of $Sb_{10}V_2Mo_3Te_2W_{0.3}U_{0.2}Bi_{0.2}$ (atomic ratio) was prepared in a manner similar to that described in Example 18 with the addition of tungsten. The oxidative conversion of isobutylene was conducted at a reaction temperature of 375°C with a contact time of 4.6 seconds. The results are shown in Table II, wherein the conversion of isobutylene is 98.5 percent, the selectivities of methacrolein and methacrylic acid are 61.3 and 15.1 percent respectively, the single-pass yield of methacrylic acid is 14.9 percent, and the composite single-pass yield of methacrolein and methacrylic acid is 75.3 percent.

EXAMPLE 20

The oxidative conversion of isobutylene was conducted in the presence of 20 grams of the catalyst of Example 7. The composition of the gaseous mixture fed to the catalyst zone consisted of 5.6 mole percent isobutylene, 5.4 mole percent 1-butene, 54 mole percent air and 35 mole percent steam at an apparent contact time of 5.0 seconds at a reaction temperature of 396°C.

The results obtained showed a 94.8 percent conversion of isobutylene, selectivities for methacrolein and methacrylic acid of 70.5 and 14.5 percent respectively and selectivities for carbon dioxide, carbon monoxide and acetic acid of 7.5, 3.2 and 4.3 percent respectively. As a consequence, the single-pass yield of methacrylic acid was 13.7 percent and the composite single-pass yield of methacrolein and methacrylic acid was 80.6 percent. The results also showed that 27.8 percent of the 1-butene in the gaseous raw material had reacted, and that the selectivity for product butadiene was 69.2 percent and the selectivities for trans-2 butene and cis-2-butene were 11.4 and 15.6 percent respectively.

EXAMPLE 21

The oxidative conversion of isobutylene was conducted with 20 grams of the catalyst of Example 7 by feeding a gaseous raw material gas having a composition of 10 mole percent of a $C_4$ hydrocarbon fraction composed of 42 mole percent isobutylene, 27 mole percent 1-butene, 10 mole percent trans-2-butene, 7 mole percent cis-2-butene, 10 mole percent n-butane, 55 mole percent air and 35 mole percent steam with an apparent contact time of 5.0 seconds at a reaction temperature of 400°C.

The results obtained showed a 95.7 percent conversion of isobutylene, selectivities for methacrolein and methacrylic acid of 69.0 and 14.2 percent respectively, a single-pass yield of methacrylic acid of 13.6 percent, and a composite single-pass yield of methacrolein and methacrylic acid of 79.6 percent. The results also showed that 42.3 percent of the n-butenes had reacted and the selectivity of butadiene was 67.6 percent.

COMPARATIVE EXAMPLE 6

An 11.6 gram amount of ammonium metavanadate $NH_4VO_3$ was dissolved in 400cc of water and 200cc of an aqueous solution containing 26.1 grams of uranyl nitrate $UO_2(NO_3)_2 \cdot 6H_2O$ was added thereto and the combined solutions were thoroughly stirred. A 16.0 gram quantity of tellurium dioxide and 73.2 grams of antimony trioxide were added to the solution while being thoroughly stirred. The resulting mixture was concentrated by evaporation and the residue dried. The dried residue was punched into tabloids of 3mm diamter which were dried and calcined at 520°C for 5 hours. The catalyst obtained in this manner had a composition of $Sb_{10}V_2Te_2U_{1.0}$ (atomic ratio). The oxidative conversion of isobutylene was conducted over the catalyst obtained at a reaction temperature of 420°C with a contact time of 5.0 seconds. The results obtained are shown in Table 11, wherein the conversion of isobutylene is 87.7 percent, the selectivities of methacrolein and methacrylic acid are 53.5 and 6.1 percent respectively, and the selectivities of acetic acid, carbon dioxide and carbon monoxide are 3.0, 24.3 and 9.1 percent respectively. As a consequence, the single-pass yield of methacrylic acid was 5.3 percent and the composite single-pass yield of methacrolein and methacrylic acid was 52.3 percent.

COMPARATIVE EXAMPLE 7

A catalyst having a composition of $Sb_{10}Mo_3Te_2U_{1.0}$ (atomic ratio) was prepared in a manner similar to that described in Comparative Example 6 except that 26.6 grams of ammonium molybdate were used instead of ammonium metavanadate. The oxidative conversion of isobutylene was conducted over the catalyst obtained at a reaction temperature of 425°C with a contact time of 5.0 seconds. The results obtained are shown in Table II, wherein the conversion of isobutylene is 82.1 percent, the selectivities of methacrolein and methacrylic acid are 57.6 and 4.1 percent respectively, the single-pass yield of methacrylic acid is 3.4 percent, and the composite single-pass yield of methacrolein and methacrylic acid is 50.7 percent.

COMPARATIVE EXAMPLE 8

A catalyst having a composition of $Sb_{10}V_2Mo_{2.4}W_{0.3}Bi_{0.2}$ (atomic ratio) was prepared in a manner similar to that described in Example 9 except that tellurium dioxide was not added in this case. The oxidative conversion of isobutylene was conducted over the catalyst obtained at a reaction temperature of 420°C with a contact time of 5.0 seconds. The results obtained are shown in Table II, wherein the conversion of isobutylene is 94.3 percent, the selectivities of methacrolein and methacrylic acid are 35.7 and 7.2 percent respectively, the single-pass yield of methacrylic acid is 6.8 percent, and the composite single-pass yield of methacrolein and methacrylic acid is 40.5 percent.

COMPARATIVE EXAMPLE 9

A catalyst having a composition of $V_2Mo_4Te_2W_{0.3}Bi_{0.2}$ (atomic ratio) was prepared in a manner similar to that described in Example 9 except that antimony trioxide was not added. The oxidative conversion of isobutylene was conducted over the catalyst obtained at a reaction temperature of 430°C with a contact time of 5.0 seconds. The results are shown in Table II, wherein the conversion of isobutylene is 87.2 percent, the selectivities of methacrolein and methacrylic acid are 58.9 and 4.3 percent respectively, the single-pass yield of methacrylic acid is 3.7 percent, and the composite single-pass yield of methacrolein and methacrylic acid is 55.1 percent.

Having now fully described this invention, it will be apparent to one of ordinary skill in the art that many changes and modifications can be made thereto without departing from the spirit or scope of the invention as set forth herein.

What is claimed as new and intended to be covered by letters patent is:

1. A process for producing methacrolein and methacrylic acid which comprises reacting isobutylene with molecular oxygen in the vapor phase in the presence of a catalytic amount of a catalyst consisting essentially of a mixture of solid metal oxides represented by the empirical formula $Sb_aV_bMo_cTe_dW_eM_fO_g$, wherein M represents at least one element selected from the group consisting of bismuth, thallium and uranium and wherein the elemental atomic ratios of said empirical formula have values of a=10, b=0.1–10, c=0.4–15, d=0.1–10, e=0–2, f=0–2 and g=16–127.

2. The process of claim 1, wherein the elemental atomic ratios of said empirical formula are a=10, b=1–4, c=1–8, d=2–8, e=0.1–1, f=0.1–1 and g=16–127.

3. The process of claim 1, wherein the catalyst is supported by a carrier.

4. The process of claim 3, wherein said carrier is selected from the group consisting of diatomaceous earth, silica, alumina, titanium oxide, carborundum, and zirconium oxide.

5. The process of claim 1, wherein said oxidation of isobutylene is conducted at a temperature in the range of 250° to 500°C.

6. The process of claim 1, wherein said oxidation of isobutylene is conducted at a temperature in the range of 350° to 420°C.

7. The process of claim 1, wherein said oxidation of isobutylene is conducted at a contact time in the range of 0.5 to 20 seconds.

8. The process of claim 1, wherein the molecular oxygen is supplied in the form of air.

9. The process of claim 1, wherein said oxidation of isobutylene is conducted in the presence of an inert

TABLE II

| Ex. | Catalyst Composition (in atomic ratio) | | | | | Reaction Condition | | | Conversion of isobutylene | Selectivity % | | | | | | Single-pass Yield |
|---|---|---|---|---|---|---|---|---|---|---|---|---|---|---|---|---|
| | Sb | V | Mo | Te | W | M | Reaction temp. °C | Conc. of isobutylene % | Contact time sec. | | MAL | MAA | Acetic acid | $CO_2$ | CO | AA | MAL / MAA |
| 7 | 10 | 2 | 2.4 | 2 | 0 | B:0.2 | 400 | 5.29 | 4.6 | 99.0 | 67.4 | 14.6 | 2.8 | 8.6 | 5.0 | 14.5 | 81.2 |
| 8 | 10 | 2 | 4 | 2 | 0 | B:0.8 | 400 | 5.56 | 4.6 | 99.5 | 67.8 | 12.8 | 4.2 | 9.0 | 4.6 | 12.7 | 80.2 |
| 9 | 10 | 2 | 2.4 | 2 | 0.3 | B:0.2 | 380 | 5.40 | 4.6 | 99.2 | 63.4 | 15.8 | 4.0 | 8.4 | 4.5 | 15.7 | 78.6 |
| 10 | 10 | 2 | 3 | 2 | 0 | Tl:0.3 | 400 | 5.21 | 5.0 | 96.8 | 67.6 | 15.3 | 3.4 | 6.7 | 3.2 | 14.7 | 80.2 |
| 11 | 10 | 2 | 3 | 2 | 0 | Tl:1.0 | 400 | 4.54 | 5.0 | 94.9 | 72.8 | 12.3 | 2.6 | 6.3 | 2.8 | 11.7 | 80.8 |
| 12 | 12 | 3 | 3 | 3 | 0 | Tl:0.6 | 400 | 4.56 | 4.2 | 99.1 | 63.0 | 17.8 | 3.9 | 9.8 | 4.5 | 17.6 | 80.1 |
| 13 | 10 | 2 | 3 | 2 | 0.3 | Tl:0.3 | 390 | 4.94 | 4.6 | 95.3 | 64.8 | 16.0 | 3.7 | 8.6 | 5.3 | 15.2 | 77.0 |
| 14 | 10 | 2 | 3 | 2 | 0.3 | B:0.2 Tl:0.3 | 386 | 4.65 | 4.6 | 98.3 | 61.7 | 16.5 | 4.3 | 8.9 | 4.7 | 16.2 | 76.9 |
| 15 | 10 | 2 | 3 | 2 | 0 | U:0.2 | 380 | 5.11 | 5.0 | 98.7 | 67.0 | 15.2 | 3.8 | 9.3 | 4.2 | 15.0 | 81.1 |
| 16 | 10 | 2 | 3 | 2 | 0 | U:0.4 | 380 | 5.14 | 5.0 | 99.3 | 64.1 | 14.3 | 5.9 | 9.7 | 5.1 | 14.2 | 77.9 |
| 17 | 10 | 2 | 3 | 2 | 0 | U:0.6 | 380 | 5.14 | 5.0 | 99.6 | 61.4 | 12.9 | 7.2 | 10.3 | 4.9 | 12.8 | 74.0 |
| 18 | 10 | 2 | 3 | 2 | 0 | B:0.2 U:0.2 | 380 | 5.39 | 4.6 | 98.0 | 64.2 | 17.3 | 3.9 | 9.1 | 4.5 | 17.0 | 79.8 |
| 19 | 10 | 2 | 3 | 2 | 0.3 | B:0.2 U:0.2 | 375 | 5.30 | 4.6 | 98.5 | 61.3 | 15.1 | 5.4 | 10.1 | 5.6 | 14.9 | 75.3 |
| Comparative Ex. | | | | | | | | | | | | | | | | | |
| 6 | 10 | 2 | 0 | 2 | 0 | U:1.0 | 420 | 4.87 | 5.0 | 87.7 | 53.6 | 6.1 | 3.0 | 24.3 | 9.1 | 5.3 | 82.3 |
| 7 | 10 | 0 | 3 | 2 | 0 | U:1.0 | 425 | 5.06 | 5.0 | 82.1 | 57.6 | 4.1 | 3.2 | 21.1 | 9.3 | 3.4 | 50.7 |
| 8 | 10 | 2 | 2.4 | 0 | 0.3 | B:0.2 | 420 | 5.18 | 5.0 | 94.3 | 35.7 | 7.2 | 13.1 | 23.5 | 14.8 | 6.8 | 40.5 |
| 9 | 0 | 2 | 4 | 2 | 0.3 | B:0.2 | 430 | 4.94 | 5.0 | 87.2 | 58.9 | 4.3 | 7.8 | 17.5 | 8.5 | 3.7 | 55.1 |

Note:
MAL: Methacrolein
MAA: Methacrylic acid gaseous diluent.

10. The process of claim 9, wherein the inert gaseous diluent is selected from the group consisting of steam, nitrogen, and carbon dioxide.

11. The process of claim 1, wherein isobutylene is admixed with another saturated or unsaturated hydrocarbon gas.

12. The process for producing methacrolein and methacrylic acid which comprises oxidizing isobutylene with a mixture of air and steam, in the vapor phase, at a temperature in the range of 250° to 500°C in which the concentration of isobutylene, air and steam are 1–10 mole percent, 20–90 mole percent and 1–50 mole percent respectively, in the presence of a catalytic amount of a catalyst consisting essentially of a mixture of solid metal oxides represented by the empirical formula $Sb_a V_b Mo_c Te_d W_e M_f O_g$, wherein M represents at least one element selected from the group consisting of bismuth, thallium and uranium; and wherein the elemental atomic ratios of said empirical formula have values of a=10, b=0.1–10, c=0.4–15, d=0.1–10, e=0–2, f=0–2 and g=16–127.

* * * * *